United States Patent [19]

Burtis et al.

[11] 3,907,010

[45] Sept. 23, 1975

[54] ANTI-POLLUTION SERVICE STATION ASSEMBLY

[76] Inventors: Wilson A. Burtis, 5011 Harvard Ave., Westminster, Calif. 92683; William C. Babcock, 2732 Walker Lee Dr., Los Alamitos, Calif. 90720

[22] Filed: Oct. 26, 1973

[21] Appl. No.: 409,939

[52] U.S. Cl. .................. 141/45; 141/52; 141/59; 141/97; 141/207; 141/346
[51] Int. Cl. .................................................. B65b 31/06
[58] Field of Search ......... 141/392, 52, 97, 59, 310, 141/290, 390, 383–386, 207, 346–347, 44–45

[56] References Cited
UNITED STATES PATENTS

| | | | |
|---|---|---|---|
| 3,566,928 | 3/1971 | Hansel | 141/392 |
| 3,814,148 | 6/1974 | Wostl | 141/392 |

*Primary Examiner*—Houston S. Bell, Jr.

[57] ABSTRACT

An anti-pollution service station assembly in which the escape of vaporized hydrocarbon products to the ambient atmosphere is minimized, both from the underground fuel storage reservoir that forms a part of the assembly as well as from fuel tanks of internal combustion engine powered vehicles during the fueling of the latter.

Vaporized hydrocarbon fuel that would normally escape to the ambient atmosphere from the fuel tank of the vehicle is, by the use of the present invention, collected and returned to the underground fuel reservoir. Hydrocarbon vapors that would normally vent to the ambient atmosphere from the underground fuel tank are adsorbed by cartridges of activated carbon or a like material, and these adsorbed vapors being subsequently recovered from the cartridge by subjecting the latter to heat, preferably in the form of steam. A delivery truck that supplies hydrocarbon fuel to the assembly above described is provided with conduit means that returns vaporized hydrocarbon fuel from an underground reservoir to the tank on the delivery vehicle as the underground reservoir is filled.

14 Claims, 13 Drawing Figures

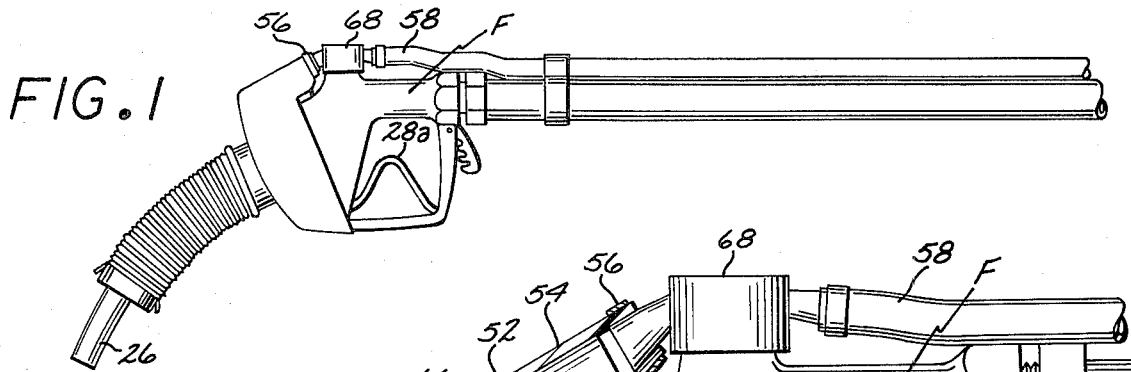
FIG.1
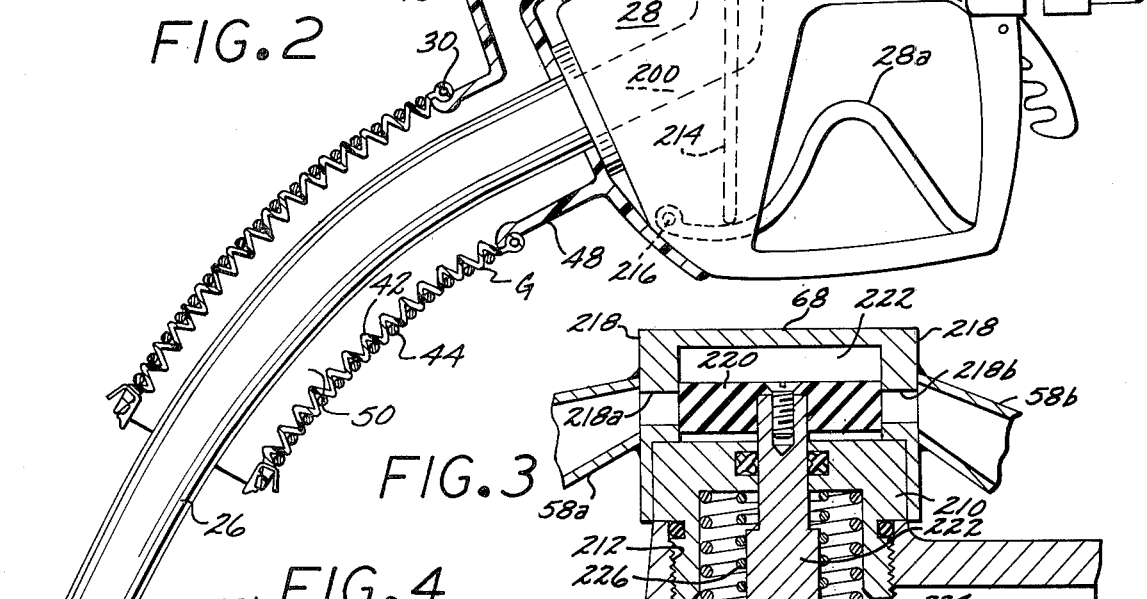
FIG.2
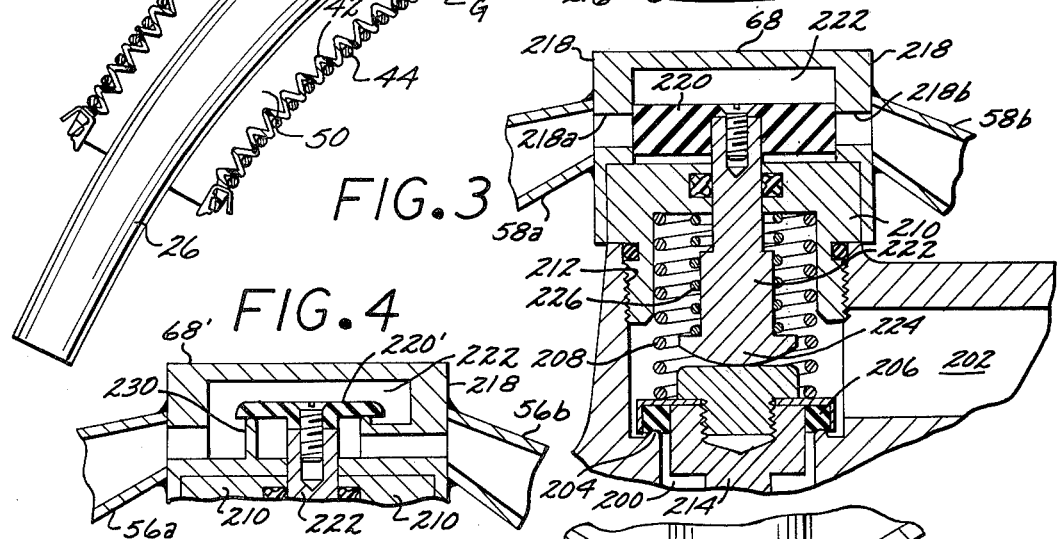
FIG.3
FIG.4
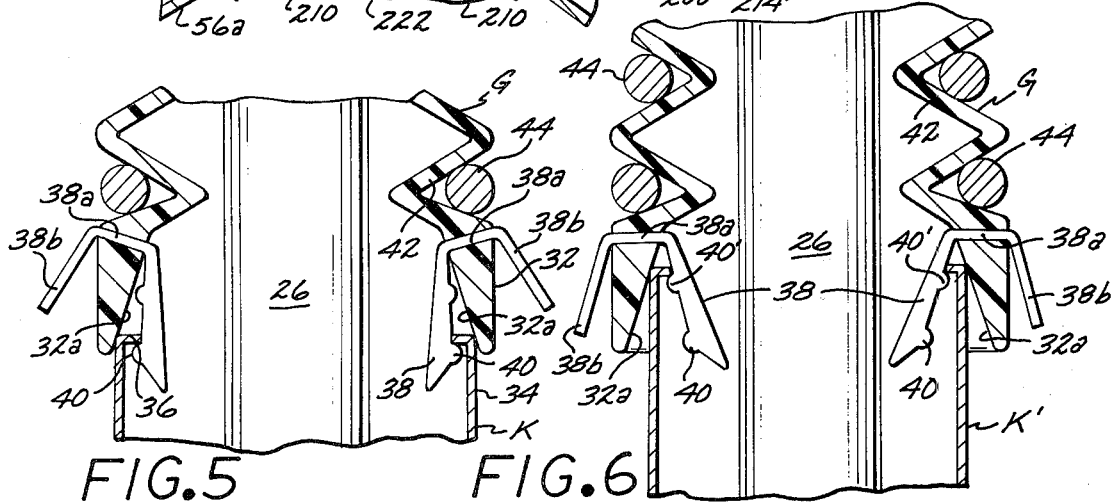
FIG.5  FIG.6

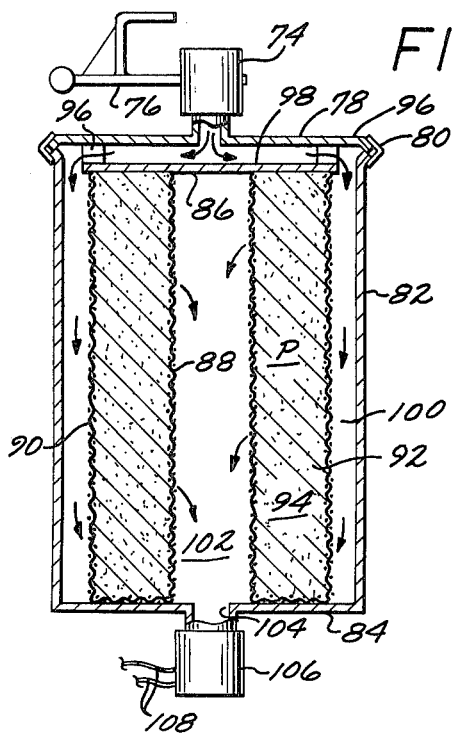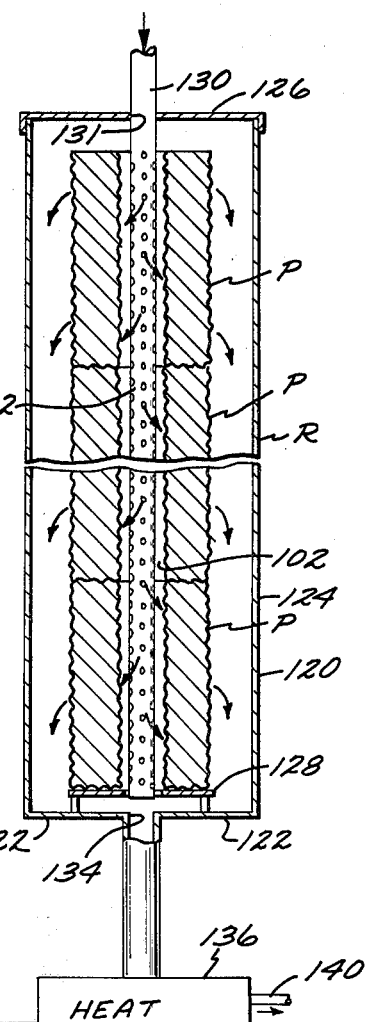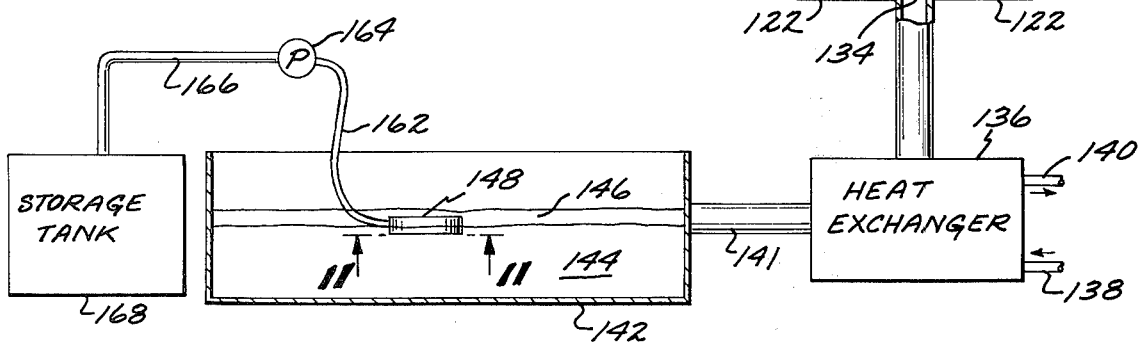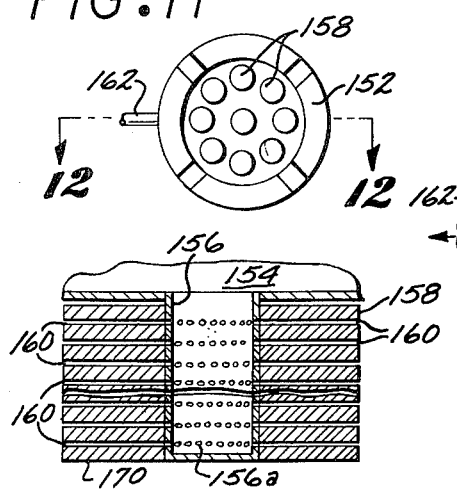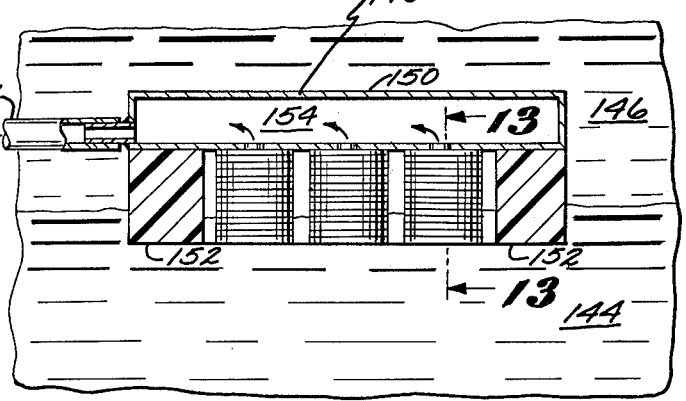

ANTI-POLLUTION SERVICE STATION ASSEMBLY

BACKGROUND OF THE INVENTION

1. Field of the Invention

Anti-pollution service station assembly.

2. Description of the Prior Art

In the past, it has been common practice to store volatile hydrocarbon fuel at a service station in an underground reservoir that is vented to the ambient atmosphere. At least one power operated pump is provided at such a service station, that withdraws hydrocarbon fuel as needed from the reservoir, and discharges the same to the fuel tank of a customer's power vehicle. As the customers tanks are filled with fuel in the above described manner, vaporized hydrocarbon fuel is displaced therefrom and escapes to the ambient atmosphere. The filling of the underground reservoir is normally from a tank truck. As the reservoir is filled, vaporized hydrocarbon fuel is displaced therefrom and also escapes to the ambient atmosphere to pollute and contaminate the latter.

The primary purpose in devising the present invention is to collect and return displaced hydrocarbon vapors from the fuel tanks of vehicles to the underground reservoir, to adsorb the vapors of the hydrocarbon fuel that would normally escape from the reservoir to the ambient atmosphere in suitable cartridges, and to collect and return displaced vaporized hydrocarbon fuel from the underground reservoir as it is filled, with the collected fuel being directed back to the interior of the tank on the delivery truck.

In addition, means are provided to recover the adsorbed fuel from the cartridges, not only from the standpoint of economics, but to prevent such fuel being displaced to the ambient atmosphere to pollute the latter.

SUMMARY OF THE INVENTION

The present invention is particularly adapted for use in conjunction with service stations at which volatile liquid hydrocarbon fuels are dispensed to fuel tanks on internal combustion engine powered vehicles, with the fuel tank having fuel inlet tubes that have inwardly extending flanges defined on the free ends thereof, and the free ends of the tubes normally being closed by removable caps.

The service station is of the type that includes an electrically operated pump having a liquid discharge opening and a suction opening therein, and an underground fuel storage tank having a filling opening, a vent opening in the upper portion thereof, as well as additional first and second openings. A first conduit is connected to the suction opening and extends downwardly through the first opening in the reservoir to terminate adjacent the bottom of the reservoir. A second flexible conduit that has first and second ends is provided with the first end of the second conduit being connected to the discharge opening of the pump, and a nozzle assembly being connected to a second end of the second conduit. The nozzle assembly including a fuel discharge tubular member that may be inserted in the fuel inlet tube on the vehicle. The nozzle assembly includes a normally closed spring loaded valve that is in communication with the tubular member and the second end of the second conduit.

A longitudinally deformable resilient tubular shroud is provided that extends about the fuel discharge tubular member, with the shroud having first and second ends, and the first end of the shroud sealed to the nozzle assembly. The shroud is formed from a resilient material that is not adversely affected by contact with hydrocarbon fuel. First means are provided on the second end of the shroud for removably engaging the flange on the filling tube and when so engaged holding the second end of the shroud in sealing engagement with the fuel inlet tube to prevent escape of vaporized hydrocarbon fuel to the ambient atmosphere. The shroud and fuel discharge tubular member cooperate to define a first confined space therebetween that is in communication with the interior of the vehicle fuel tank when the second end of the shroud is in sealing engagement with the fuel inlet tube.

A blower is provided that has an inlet and a discharge opening. Electric power means are provided for operating the pump. Second means are supplied for concurrently actuating the blower when the pump operates. A third conduit is connected to the shroud and is in communication with the first confined space and the blower inlet. A fourth conduit extends between the blower discharge and the second opening in the reservoir.

Hydrocarbon vapor adsorbing means are connected to the vent of the reservoir to prevent escape of hydrocarbon fuel vapor from the reservoir to the ambient atmosphere. The blower cooperates with the third and fourth conduit to return hydrocarbon vapors from the fuel tank of a vehicle to the reservoir during the filling of the fuel tank of the vehicle at the service station.

Each tank truck that delivers hydrocarbon fuel to the service station is provided with a flexible hose that is removably connectable to the filling opening on the reservoir, and when so connected a fifth conduit is placed in communication with the upper interior portion of the reservoir. As fuel is discharged from the delivery truck into the reservoir, hydrocarbon fuel vapor is displaced therefrom. The displaced fuel vapor has a volume greater than the volume of the liquid fuel that caused it to be displaced.

A second blower is mounted on the delivery truck, with a first end of the fith conduit connected to the inlet of the second blower. A sixth conduit extends from the discharge of the blower to the interior of the tank on the delivery truck. The interior of the tank on the delivery truck is in communication with a container that holds a cartridge of adsorbent material such as activated carbon or the like. As liquid hydrocarbon fuel discharges from the tank on the delivery truck by gravity into the reservoir, the space in the tank previously occupied by the liquid fuel is replaced by vaporized hydrocarbon fuel, and without vaporized fuel being discharged to the ambient atmosphere to contaminate the latter.

BRIEF DESCRIPTION OF THE DRAWINGS

FIG. 1 is a side elevational view of a valve controlled nozzle for dispensing volatile hydrocarbon fuel into the tank of a vehicle without vapor from the fuel contaminating the atmosphere;

FIG. 2 is an enlarged longitudinal cross sectional view of the device shown in FIG. 1;

FIG. 3 is a fragmentary vertical cross sectional view of the upper central portion of the nozzle shown in FIG. 2;

FIG. 4 is a fragmentary vertical cross sectional view of an alternate upper central portion of the nozzle shown in FIG. 2;

FIG. 5 is an enlarged fragmentary cross sectional view of a portion of the nozzle and illustrating the manner in which the shroud associated therewith removably and sealingly engages the free end of a fuel inlet or filling tube;

FIG. 6 is the same cross sectional view of the nozzle and shroud associated therewith as shown in FIG. 5, but illustrating the manner in which the seal is effected with a filling tube of smaller diameter than that shown in FIG. 3;

FIG. 9 is a longitudinal cross sectional view of the vapor recovery unit and cartridge removably mounted therein;

FIG. 10 is a diagrammatic view of a device for recovering gasoline from the cartridges, one of which cartridge is shown in FIG. 9;

FIG. 11 is a bottom plan view of an assembly for separating recovered hydrocarbon fuel from a body of water on which it floats;

FIG. 12 is a longitudinal cross sectional view of the assembly as shown in FIG. 11 and taken on the line 12—12 thereof; and FIG. 13 is a fragmentary transverse cross sectional view of the assembly taken on the line 13—13 of FIG. 12.

DESCRIPTION OF THE PREFERRED EMBODIMENT

Figure 7:
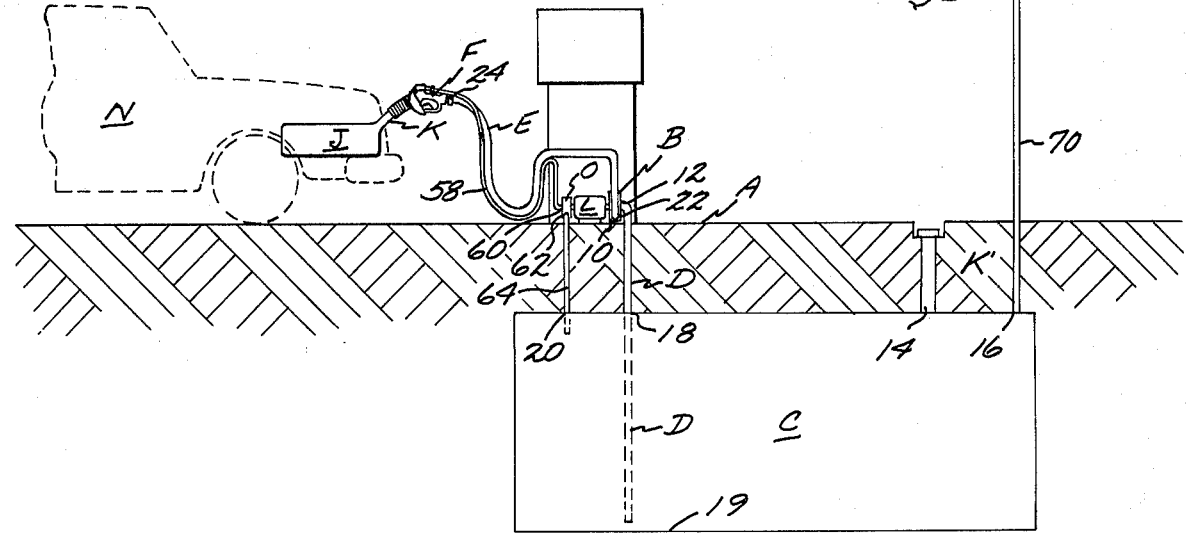
FIG. 7 is a side elevational view of the invention and a vapor recovery unit in combination with a conventional gasoline pump and gasoline storage tank.

A service station A as shown in FIG. 7 that includes an electrically operated pump B and an underground fuel reservoir C for a volatile hydrocarbon fuel such as gasoline. The pump B includes a discharge opening 10 and suction opening 12. The reservoir C as can be seen in FIG. 7 includes a filling opening 14 and vent opening 16. The reservoir C also includes a first opening 18 and second opening 20 in the upper portion thereof.

A first conduit D is provided that extends from the suction opening 12 in pump B to the first opening 18, and continues downwardly therethrough to terminate adjacent the bottom 19 of the reservoir C. A second conduit or hose E of a flexible nature is also provided that has a first end 22 and second end 24. The first end 22 is connected to the pump discharge 11 as best seen in FIG. 7, with the second end 24 being connected to a nozzle assembly F that is also shown in the same figure. The nozzle assembly F as best seen in FIGS. 1 and 2 includes a tubular fuel discharge member 26 that is connected to a spring loaded valve 28 of conventional design that is normally closed, but is opened when a trigger 28a is manually moved from a first position as shown in FIG. 2 to a second position.

The tubular member 26 as may be seen in FIG. 2 is surrounded by a resilient shroud G that is formed from a non-metallic material such as a polymerized resin that is not adversely affected by contact with a hydrocarbon fuel such as gasoline or the like. A first end 30 of the shroud G sealingly engages a tubular boss 48 that is a part of the valve assembly F as shown in FIG. 2. The shroud G also includes a free end 32 shown in FIG. 5 that may be brought into removable sealing engagement with the free end 34 of a fuel inlet tube K that extends upwardly from a fuel tank J on a power operated vehicle N as illustrated in FIG. 7. The free end 34 of fuel inlet tube K has a circumferentially extending inwardly projecting circular flange 36 formed on a part thereof. The second end 32 of shroud G supports two or more circumferentially spaced clips 38 that are at all times tend to pivot to first positions where first protuberances 40 thereon are transversely spaced a distance greater than that between the most adjacent edges of the flange 36.

The shroud G as can be seen in FIG. 2 is formed with coarse threads 42 that are engaged by a helical spring 44. The valve body 28 and the tubular member 26 support a housing 46 that includes the forwardly extending boss 48 that is of tubular structure. The second end 30 of shroud G as can best be seen in FIG. 2 is sealingly secured to the forward end of the boss 48 by conventional means. The boss 48, interior of the shroud G, and exterior surface of a portion of tubular member 26 cooperate to define a confined space 50 of annulus shape that is in communication with at least one passage defining portion 52 of the housing 46 that, preferably develop into a tubular extension 54 that is connected by conventional means 56 to a flexible third conduit 58. Electric power means L, preferably an electric motor, is provided to concurrently drive the pump B, as well as a blower O.

The third conduit 58 is connected to an inlet opening 60 in blower O, with the discharge opening 62 of blower O being connected by a fourth conduit 64 to second opening 20 in reservior C. The invention is illustrated in FIG. 7 as having the pump B and blower O concurrently driven by a single electric motor L. It will be apparent that should it be so desired the blower O could be driven by a second electric motor that is not shown, but is concurrently electrically energized with the motor L1 which is this modification drives the pump B only.

As a safety precaution a fire screen 66 is positioned in passage defining portion 52 to prevent an inadvertent flame or fire adjacent second end 32 of shroud G being propogated through third conduit 58. A valve structure 68 as shown in FIG. 3 is preferably included as a part of nozzle F, with the vavle structure connected to third conduit 58. The valve structure 68 and the function it serves will later be described in detail. Valve 68 prevents a vacuum being formed inside shroud G only when fuel is being discharged from tube 26. Although the passage defining means 52, extension 54 and third conduit 58 are illustrated as being situated above nozzle assembly F and the second conduit or hose E, it will be apparent that they may be situated on the underside thereof if desired, if the valve structure 68 is eliminated.

The clips 38 as shown in FIG. 3 have intermediate portions 38a sealingly embedded in the resilient material defining the second end portion 32 of shroud G. The outer ends of intermediate portions 38a develop into handles 38b which when pressed towards one another pivot the portions of the clips on which protuberances 40 are defined towards one another. When the clips 38 have the handles 38b pressed towards one another, the protuberances are freed from engagement with flange 36, and the tubular member 26 may be removed from fuel inlet tube K. In FIG. 5 it will be seen that the end portion 32 defines a frusto-conical surface 32a on the interior thereof that is brought automatically into removable sealing contact with the outer periphery of the fuel inlet tube K as tubular member 26 is inserted therein. Insertion of tubular member 26 into inlet tube K is continued until the spring loaded shroud G has the clips 38 thereon removably engage flange 36.

When a fuel inlet tube K' is provided on vehcile N, which inlet tube has a smaller internal diameter than inlet tube K, the same procedure as above described is followed, but with the flange 36 being engaged by second protuberances 40' on the clips 38 as illustrated in FIG. 6.

Figure 8:
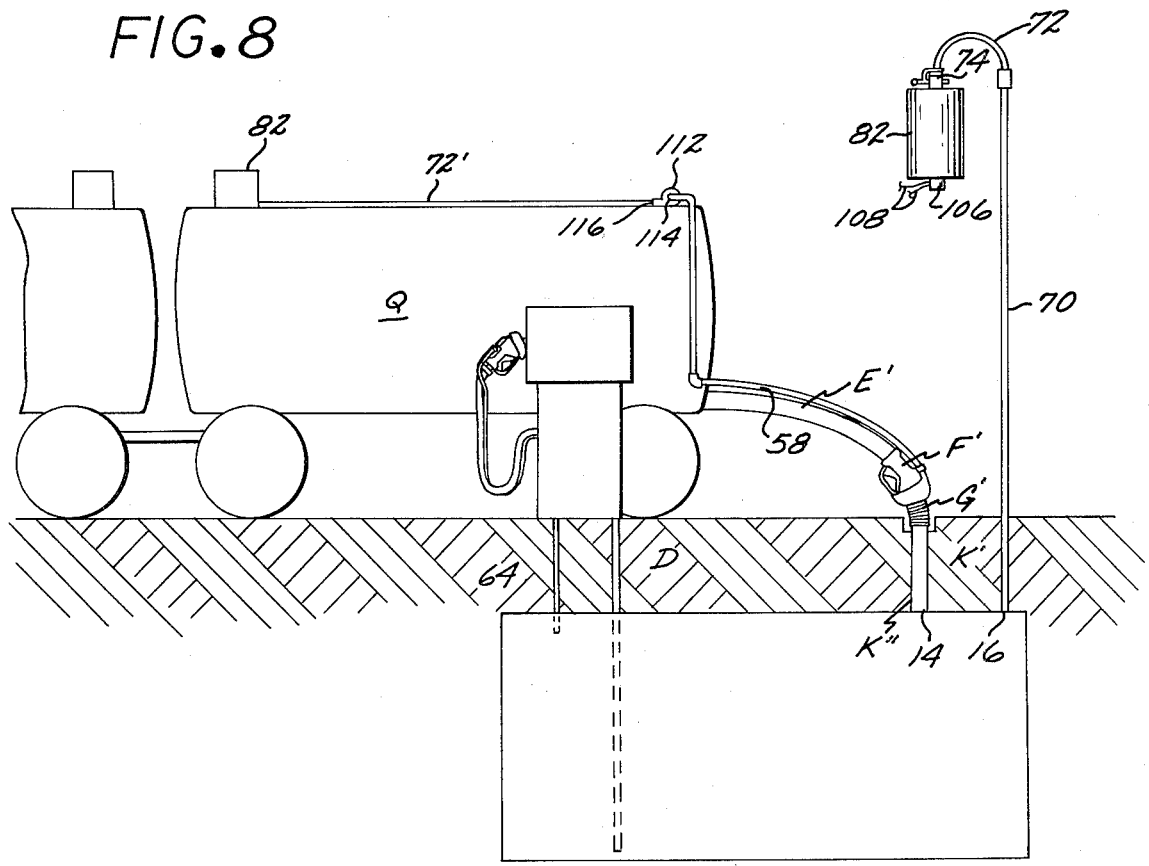
FIG. 8 is a side elevational view of the invention as used on a gasoline tanker, and showing the same storage tank and vapor recovery unit illustrated in FIG. 7.

Filling opening 14 of reservoir C as shown in FIG. 8 has a filling tube K'' extending upwardly therefrom that is of the same general structure as filling tube K but of greater transverse crosssection, and is normally closed by a cap (not shown). Second opening 16 has a tubular member 70 extending upwardly therefrom that preferably develops into a downturned semi-circular portion 72 that may be removably engaged by the fixture 74 shown in FIG. 9 that includes a transverse slide 76. Fixture 74 is secured to a top 78, which top by a conventional snap ring 80 or other conventional fastening means is secured to a cylindrical container 82 having a bottom 84.

A cartridge P is provided as shown in FIG. 9 that includes inner and outer radially spaced cylindrical side walls 88 and 90 preferably formed from screen and having closed ends. Sidewalls 88 and 90 define an annulus shaped space 92 therebetween that is filled with a material 94 such as activated carbon that adsorbs hydrocarbon fuel vapors. Top 78 has a number of spaced legs 96 projecting downwardly from the interior surface thereof, which legs support a plate 98 that is in sealing contact with the upper end of cartridge P as may be seen in FIG. 7. Sidewall 90 cooperates with cartridge P to define a first annulus shaped space 100. The sidewall 88 defines a longitudinal passage 102 therein that is in communication with an opening 104 formed in bottom 84. Opening 104 is in communication with a downwardly extending tube that supports a conventional electrically operated alarm device 106 that is energized by a low voltage electric current through conductors 108. The alarm device 106 is of the type used on boats to indicate when volatile hydrocarbon fumes have risen to a dangerous level in the bilge.

The hydrocarbon fuel delivery assembly Q includes a wheel supported tank 110 from which a hose E' extends that terminates in a nozzle assembly F'. The hose E' and nozzle assembly F' are similar to second conduit E and nozzle assembly F previously described. The nozzle assembly F' includes a shroud G' that serves the same function as shroud G previously described. A conduit 58' is operatively associated with hose E as may be seen in FIG. 6, and serves the same function as conduit 58 previously described.

A second power operated blower 112 is mounted on vehicle Q as shown in FIG. 8 and operated by power means not shown. Inlet opening 114 of blower 112 is connected to conduit 58'. Discharge opening 116 of blower 112 is connnected to a container 82 and associated equipment as shown in FIG. 9 by conventional means (not shown).

The invention above described permits a vehicle N to have the fuel tank J thereof filled with a volatile hydrocarbon fuel such as gasoline without vapor from the fuel escaping to contaminate the ambient atmosphere. The nozzle assembly F is inserted in the fuel tank inlet tube K for the shroud G to effect a seal therewith as shown in either FIG. 5 or 6. Pump B and blower O are now concurrently driven, with fuel being discharged into tank J, and hydrocarbon fuel vapor being withdrawn therefrom through conduits 58 and 64 and returned to underground reservoir C. Excess fuel vapor in reservoir C is displaced therefrom and flows through tubular members 70 and 72 to the interior of container 82 where it is adsorbed by the cartridge P. In FIG. 9 it will be noted that the hydrocarbon fuel vapor first enters space 100 and flows towards passage 102. However, until material 94 has adsorbed the maximum quantity of the vaporized fuel of which it is capable, no vaporized fuel will enter passage 102. When vaporized fuel starts to enter passage 102 the alarm 106 is actuated, and the catridge P must then be changed.

The cartridges P are reusable and with proper care should last for an indefinite period of time. The cartridge P containing the maximum adsorbed hydrocarbon fuel vapor are collected, and stacked one above the other in a fuel recovery unit R shown in FIG. 10.

Recovery unit R as shown in FIG. 10 includes a vertically disposed container 120 that has a bottom 122, cylindrical sidewall 124, and a cover 126 removably mounted on the upper edge portion of the side wall.

The bottom 122 supports a tray 128 on which the lowermost one of a number of cartridges P rest. A pipe 130 extends downwardly through an opening 131 in cover 126. The portion of the pipe 130 within the container 120 has perforations 132 formed therein. The portion of pipe 130 that has perforations 132 therein is situated with the passages 102 of cartridges P. The upper end of pipe 130 is connected to a conventional source of steam (not shown).

Steam that discharges through the perforations 132 forces adsorbed hydrocarbon fuel from the cartridges P, which with water resulting from condensing of the steam flows to the bottom 122. Bottom 122 has an opening 134 therein through which a mixture of liquid hydrocarbon fuel and hot water flows to a heat exchanger 136 of conventional design that has coils (not shown) therein through which cooling water flows from a tube 138 and exits through a tube 140. The cooled mixture of hydrocarbon fuel and water flows through a conduit 141 into a separating tank 142 where the mixture stratifies into a lower layer 144 of water and an upper layer 146 of liquid hydrocarbon fuel.

A fuel and water separating device 148 is shown in FIGS. 11, 12 and 13 that includes a hollow body 150 that is secured to a ring 152 that is buoyant in water but not buoyant in liquid hydrocarbon fuel. The interior 154 of body 150 is in communication with a number of spaced vertically disposed perforated tubes 156 that extends downwardly therefrom. Each of the tubes 156 is surrounded by a number of slightly spaced horizontal plates 158. The depth of the spaces 160 between plates 158 is so selected that when the interior 154 is maintained at a negative pressure, liquid hydrocarbon fuel can flow through the spaces to the perforations 156a in tubes 156 to subsequently flow to interior 154 but water cannot so do. From experience it has been found that spaces 160 should be approximately two one thousandths of an inch in depth. Assembly 148 has a flexible conduit 162 secured thereto and in communication with the interior 154.

Conduit 162 is connected to the suction side of a power driven pump 164, and the pump discharging the separated liquid hydrocarbon fuel through a conduit 166 to a storage tank 158 for subsequent use. The lower end of the tube 156 as shown in FIG. 11 has a horizontal plate 170 secured thereto on which the plates 158 rest. The plates 158 are maintained with spaces 160 therebetween by circumferentially positioned spaces or the like (not shown). After the cartridges P have had adsorbed hydrocarbon fuel removed therefrom as above described, the cartriges may be reused in the containers 92 as illustrated in FIG. 7.

The nozzle F as shown in FIGS. 2 and 3 has first and second passages 200 and 202 for liquid hydrocarbon fuel extending therethrough, and the passages at their junction defining a horizontal circular valve seat 204 against which a valve member 206 is at all times urged by a first compressed spring 208. Spring 208 is situated in a confined space defined by the body of valve 28 and a plug 210 that externally threaded and engages internal threads 212 formed in the body of valve 28. Valve member 206 has a shank 214 extending downwardly therefrom and slidably mounted in the body of valve 28. The lower end of shank 214 engages a portion of handle 28a, and the handle when pivoted upwardly on a pin 216 causing the valve member 206 to raise from seat 204 to establish communication between first and second passages 200 and 202, with liquid hydrocarbon fuel now capable of discharging to tank J as shown in FIG. 1.

The second valve 68 may be defined by an inverted cup shaped housing 218 that is sealingly mounted on plug 210 as shown in FIG. 3. Housing 218 has two oppositely disposed ports 218a and 218b formed in a cylindrical sidewall thereof, which ports are in communication with spaced sections 58a and 58b of conduit 58 as shown in FIGS. 2 and 3. A second resilient valve member 220 is slidably mounted in a confined space 222 defined by housing 218. The valve member 220 when in a first position as shown in FIG. 3 obstructs communication between first and second ports 218a and 218b, and prevents vaporized hydrocarbon fuel from being drawn from first conduit section 58a to section 58b. Second valve member 220 is secured to a vertically disposed pin 222 that has an enlarged lower end 224. A second compressed helical spring 226 encircles pin 222, with the upper end of the spring bearing against the upper interior surface of plug 210, and the lower end of the spring against the enlarged lower end 224. The second spring 226 at all times endeavors to maintain the second valve member 220 in the first sealing position shown in FIG. 3.

When the handle 28a is pivoted upwardly, the first valve member 206 and second valve member 220 are concurrently moved to second positions to permit liquid hydrocarbon fuel to discharge to tank J and vaporized hydrocarbon fuel to be withdrawn from the tank as previously described.

A modified form 68' of the second valve is shown in FIG. 4 that serves the same purpose and occupies the same position as the first form 68, but includes a ring shaped valve seat 230 into which a resilient valve member 220' is at all times urged into sealing engagement by second spring 226 (not shown).

The use and operation of the invention has been described previously in detail and need not be repeated.

We claim:

1. In combination with a service station that dispenses volatile hydrocarbon fuel to internal combustion engine-powered vehicles of the type which include a fuel tank having a fuel inlet tube and a cap that removably closes said free end, which service station includes an electrically operated pump having a liquid discharge opening and a suction opening therein; an underground fuel storage reservoir having a filling tube, a vent opening, and first and second openings in the upper portion of said reservoir; a first conduit connected to said suction opening and extending downwardly through said first opening to terminate adjacent the bottom of said storage reservoir; a second flexible conduit having first and second ends, with said first end of said second conduit being connected to said discharge opening; a nozzle assembly connected to said second end of said second conduit, said nozzle assembly including a fuel discharge tubular member that may be inserted in said fuel inlet tube, and a normally closed spring-loaded valve in communication with said tubular member and said second end of said second conduit, with said reservoir being filled with volatile hydrocarbon fuel from a delivery truck having a tank thereon which by a hose may be connected to said filling tube of said reservoir, the improvement for preventing the escape of said hydrocarbon fuel in the form of vapor to the ambient atmosphere both when fuel tanks on said vehicles and said reservoir is being filled with hydrocarbon fuel, which improvement comprises:

a. a first longitudinally deformable, resilient tubular shroud that extends about said fuel discharge tubular member, which shroud has first and second ends, with said first end being sealed to said nozzle assembly and said first shroud being formed from a material impervious to said hydrocarbon fuel;

b. first means on said second end of said first shroud for removably engaging said flange and removably interlocking said second end of said first shroud in sealing engagement with said fuel inlet tube, with said first shroud and fuel discharge tubular member cooperatively defining a first confined space therebetween that is in communication with the interior of said vehicle fuel tank when said second end of said first shroud is in sealing engeagement with said fuel inlet tube;

c. a first blower having an inlet and a discharge opening;

d. electric power means for operating said pump;

e. second means for concurrently actuating said first blower when said pump operates;

f. a third conduit connected to said first shroud and in communication with said first confined space and said blower inlet;

g. a fourth conduit extending between said blower discharge and said second opening in said reservoir;

h. first hydrocarbon fuel vapor adsorbing means connected to said vent to prevent escape of hydrocarbon vapor from said reservoir to the ambient atmosphere, with said blower cooperating with said third and fourth conduits to return hydrocarbon vapor from said fuel tank to said reservoir during the filling of said fuel tank at said service station;

i. a second power-operated blower mounted on said vehicle, which second blower has an inlet opening and a discharge opening formed therein;

j. a fifth conduit having first and second ends, with said first end being connected to said inlet of said second blower;

k. third means for connecting said second end of said fifth conduit to the interior of said reservoir when said hose is connected to said filling tube of said reservoir;

l. a sixth conduit having first and second ends, with said first end being connected to said discharge of said second blower; and m. second hydrocarbon fuel vapor adsorbing means mounted on said vehicle and connected to said second end of said sixth conduit, with said second vapor adsorbing means adsorbing hydrocarbon fuel vapor drawn from said blower as said reservoir is filled with liquid hydrocarbon fuel from said vehicle through said hose to prevent displaced hydrocarbon fuel vapor in said reservoir from being discharged into the ambient atmosphere.

2. The improvement as defined in claim 1 wherein said fuel inlet tube has an inwardly extending flange and said first means are a plurality of resiliently supported clips that removably engage said flange when said tubular member is inserted into said fuel inlet tube to the extent that said shroud is forced into sealing engagement with said filling tube.

3. The improvement as defined in claim 1 wherein said first hydrocarbon fuel vapor adsorbing means includes:

n. a closed container that defines a confined space, with said container including a top and a bottom, each of which has an opening formed therein, and with said opening in said top being in communication with said vent opening in said reservoir;

o. a cartridge in said container and of a material that adsorbs hydrocarbon fuel vapor;

p. an electrically actuated sensor and alarm that is actuated when the sensor is exposed to air containing greater than a predetermined percentage of hydrocarbon fuel vapor; and q. means for maintaining said sensor in communication with said opening in said bottom of said container.

4. The improvement as defined in claim 3 wherein said material that adsorbs hydrocarbon fuel vapor is activated carbon.

5. The improvement as defined in claim 3 wherein said second hydrocarbon fuel vapor adsorbing means is of the same structure as said first hydrocarbon fuel vapor adsorbing means.

6. In combination with a fuel tank of a vehicle that has an inlet tube for volatile hydrocarbon fuel, a nozzle assembly for filling said tank without allowing the escape of hydrocarbon fuel vapor to the ambient atmosphere, said nozzle assembly comprising:

a. a normally closed spring loaded valve having an inlet opening and a discharge opening, and a handle that when moved from a first to a second position places said valve in an open position;

b. a tubular member connected to said valve and in communication with said discharge opening;

c. a housing secured to said valve, said housing including a tubular portion that envelops a part of said tubular member and is radially spaced therefrom;

d. an elongate resilient tubular shroud having first and second ends that envelops at least a portion of said tubular member, with the internal diameter of said shroud substantially greater than the external diameter of said tubular member, said housing, tubular member and shroud cooperating to define a confined space in communication with the interior of said tank but out of communication with the ambient atmosphere when said tubular member is inserted in said inlet tube to the extent said second end of said shroud seals with said inlet tube;

e. a first conduit in communication with said first confined space;

f. first means for withdrawing hydrocarbon fuel vapor through said first conduit as liquid hydrocarbon fuel is discharged through said discharge opening, valve and tubular member into said tank with said shroud in sealing engagement with said inlet tube; and g. second means for removably interlocking said nozzle assembly in a fixed position with said inlet tube when said shroud is in sealing engagement with the latter.

7. The combination as defined in claim 6 in which said inlet tube has an inwardly extending flange on the free end thereof, and said second means are a plurality of clips resiliently supported from said shroud that removably engage said flange when said shroud is in sealing engagement with said inlet tube.

8. A device for use in dispensing a volatile liquid hydrocarbon fuel into the fuel inlet tube of a tank without vapor of said fuel escaping to the ambient atmosphere from a first end of said inlet tube, said inlet tube having a flange that extends inwardly from said first end thereof, said device including:

a. a valve body assembly that has first and second concurrently operable spring loaded valve members within the interior thereof that tend to remain in first positions, said first valve member when in said first position obstructing communications between first and second openings in said valve body assembly and said second valve member when in said first position obstructing communications between third and fourth openings in said valve body assembly;

b. first means for supplying said fuel to said first opening from a reservoir for said fuel;

c. a tubular nozzle secured to said valve body assembly and in communication with said second opening, said nozzle being of such transverse cross section as to be slidably inserted in said fuel inlet tube;

d. a resilient longitudinally deformable tubular shroud having first and second ends, with said first end of said shroud being sealing by supported from said valve body assembly, said shroud cooperating with said nozzle to define an annulus shaped space therebetween that is in communication with said fourth opening, and said shroud at said second end defining a ring shaped tapered surface that sealingly engages said first end of said inlet tube when said nozzle is inserted therein to a predetermined extent;

e. second manually operated interlock means on said second end of said shroud that is capable of removably engaging said flange on said inlet tube to hold said ring shaped tapered surface of said second end of said shroud in sealing engagement with said first end of said inlet tube;

f. third means for maintaining a negative pressure on said third opening, with said third means being in communication with said fuel reservoir; and g. fourth manually operable means for concurrently moving said first and second valve members from said first positions to second positions whereupon liquid fuel flows through said first and second openings and said nozzle to said tank and fuel vapor displaced by liquid fuel entering said tank being drawn into said annulus shaped space and through said third and fourth openings by said third means to be returned to said reservoir.

9. A device as defined in claim 8 in which said shroud has a plurality of longitudinally spaced circumferentially extending corrugations formed therein.

10. A device as defined in claim 9 which in addition includes:

h. a helical spring that encircles said shroud and engages said corrugations, said spring cooperating with said shroud to increase the longitudinal force required to longitudinally deform said shroud.

11. A device as defined in claim 8 in which said second means are a plurality of U-shaped clips resiliently supported in circumferentially spaced relationship from said second end of said shroud that engage said flange when said clips are in first positions, and said clips including outwardly disposed portions which when an inwardly directed force is manually applied thereto moves said clips to second positions where they are disengaged from said flange.

12. A device as defined in claim 11 where said clips are of such structure that they may removably engage flanges of different diameters on said inlet tubes.

13. In combination with a service station that dispenses volatile hydrocarbon fuel to internal combustion engine-powered vehicles of the type which include a fuel tank having a fuel inlet tube and a cap that removably closes said free end, which service station includes an electrically operated pump having a liquid discharge opening and a suction opening therein; an underground fuel storage reservoir having a filling tube, a vent opening, and first and second openings in the upper portion of said reservoir; a first conduit connected to said suction opening and exending downwardly through said first opening to terminate adjacent the bottom of said storage reservoir; a second flexible conduit having first and second ends, with said first end of said second conduit being connected to said discharge opening; a nozzle assembly connected to said second end of said second conduit, said nozzle assembly including a fuel discharge tubular member that may be inserted in said fuel inlet tube, and a normally closed spring-loaded valve in communication with said tubular member and said second end of said second conduit, with said reservoir being filled with volatile hydrocarbon fuel from a delivery truck having a tank thereon which by a hose may be connected to said filling tube of said reservoir, the improvement for preventing the escape of said hydrocarbon fuel in the form of vapor to the ambient atmosphere both when fuel tanks on said vehicles and said reservoir is being filled with hydrocarbon fuel, which improvement comprises:

a. a first longitudinally deformable, resilient tubular shroud that extends about said fuel discharge tubular member, which shroud has first and second ends, with said first end being sealed to said nozzle assembly and said first shroud being formed from a material impervious to said hydrocarbon fuel;

b. first means on said second end of said first shroud for removably engaging said flange and interlocking said second end of said first shroud in sealing engagement with said fuel inlet tube, with said first shroud and fuel discharge tubular member cooperatively defining a first confined space therebetween that is in communication with the interior of said vehicle fuel tank when said second end of said first shroud is in sealing engagement with said fuel inlet tube;

c. first means for directing hydrocarbon fuel vapir displaced into said confined space during the filling of said reservoir;

d. first hydrocarbon fuel vapor adsorbing means connected to said vent to prevent escape of hydrocarbon vapor from said reservoir to the ambient atmosphere.

14. The combination as defined in claim 13 which in addition includes:

e. second means on said vehicle and in communication with the interior of said reservoir for adsorbing hydrocarbon fuel vapor that is displaced from said reservoir during the filling of said reservoir with liquid hydrocarbon fuel.

* * * * *